Feb. 11, 1941. E. O. DIETERICH 2,231,057
MANUFACTURE OF RUBBER MATERIAL
Filed July 27, 1938
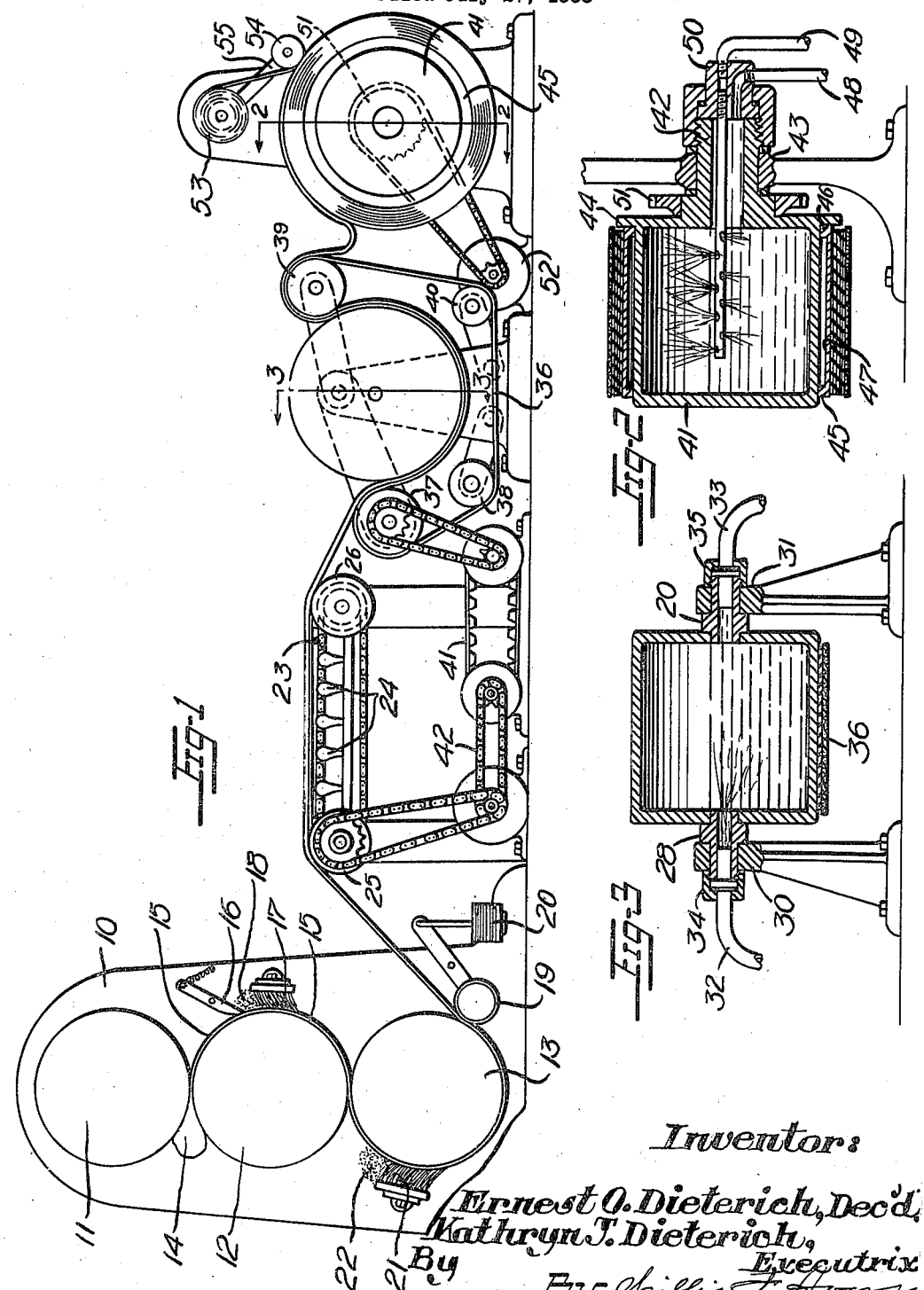
Inventor:
Ernest O. Dieterich, Dec'd,
Kathryn J. Dieterich,
Executrix
By Patented Feb. 11, 1941

2,231,057

UNITED STATES PATENT OFFICE 2,231,057

MANUFACTURE OF RUBBER MATERIAL

Ernest O. Dieterich, deceased, late of Akron, Ohio, by Kathryn J. Dieterich, executrix, Akron, Ohio, assignor to The B. F. Goodrich Company, New York, N. Y., a corporation of New York Application July 27, 1938, Serial No. 221,585

4 Claims. (Cl. 18—53)

This invention relates to the manufacture of rubber material and is especially useful where long lengths of soft sheet rubber are to be manufactured.

In the manufacture of thin sheet rubber of high quality such as the material used for producing rubber thread for use in the manufacture of elastic garments and the windings of golf balls, it is desirable to produce the sheet material in pieces of great length. The material must also have uniform physical properties throughout. It is therefore necessary that vulcanization be uniform.

It has been the practice to wind the calendered sheet, after it has cooled from the calendering operation, upon a hollow drum of relatively large diameter between layers of liner cloth and to subject the material to vulcanization by placing the drum in a vulcanizing chamber, usually filled with hot water or steam under pressure. In order to provide as uniform a vulcanization as possible the total thickness of the material wound upon the drum must be relatively small as otherwise the innermost and outermost convolutions, being almost directly in contact with the heating fluid, will become fully vulcanized in advance of the intervening convolutions. It has also been necessary in the past to subject the material to a gradually increased temperature over a long period of time starting with a temperature well below the temperature of vulcanization in an effort to equalize vulcanization of the convolutions by bringing them up to vulcanizing temperature gradually. This has unduly lengthened the time required for vulcanization and the uniformity of vulcanization through the roll has not always been satisfactory. As the size of the drums is limited by the dimensions of the available vulcanizing equipment and by convenience of handling, the length of material which may be produced is limited.

The principal objects of this invention are to provide improved procedure for the production of vulcanized rubber of great length, to provide a high degree of uniformity of vulcanization, to provide economy of heat, and generally to facilitate the production of rubber sheet material.

Other objects will appear from the following description and the accompanying drawing.

Of the drawing:

Fig. 1 is a diagrammatic view in elevation of apparatus which may be used in carrying out the invention in its preferred form.

Fig. 2 is a detail view thereof in cross section taken on line 2—2 of Fig. 1.

Fig. 3 is a similar cross sectional view taken on line 3—3 of Fig. 1.

Referring to the drawing, which illustrates one form of apparatus by which the invention may be practiced, the numeral 10 designates a three roll calender such as is used for calendering sheet rubber and having a top roll 11, a middle roll 12, and a bottom roll 13. A bank 14 of suitable rubber composition is fed between the top roll and the middle roll where under the influence of heat and pressure it is rolled into sheet form. The sheet 15 adheres to and follows the middle roll, where it is cut to width by knives 16 spring pressed against the roll. The exposed face of the rubber sheet is dusted with starch or other dusting material as it passes around the middle roll, and for this purpose a brush 17 is mounted to bear against the sheet as it passes the middle roll and a bank of dust 18 is kept at the entrance angle of the brush with the roll. The sheet passes around the lower roll and as it is no longer adhesive on its roll contacting face due to the dusting of starch, a cloth faced presser roll 19 is kept in engagement with the sheet by a weight 20 to cause the sheet to follow the roll. As the sheet passes the lower roll, its exposed face is dusted by a second dust brush 21 and a bank 22 of dust.

As the sheet leaves the calender it is passed over an inspection table where it may be inspected for flaws, such as pin holes, dirt and the like. For this purpose a glass topped table 23 is employed. A bank of electric lights 24 is mounted under the glass top so that the inspector may observe the sheet by light transmitted therethrough. Rolls 25, 26, at the ends of the table may be driven from the calender by convenient gearing to advance the sheet.

After the sheet has been inspected it is carried about a heated drum which is maintained at substantially the vulcanizing temperature. The drum is rotatably supported upon hollow trunnions 28, 29 supported by pedestal bearings 30, 31. The drum is hollow and is supplied with hot water or other heating fluid by means of inlet and outlet pipes 32, 33 which enter the trunnions through stuffing boxes 34, 35. The drum may be partially surrounded by and driven by a belt 36 trained over guide pulleys 37, 38, 39 and 40 which may be driven from any suitable source of power. As the belt contacts with a long arc of the drum, the rubber material between the drum and the belt is heated substantially to vulcanizing temperature during its travel about the drum.

As considerable shrinkage takes place in the rubber sheet between the calender and the drum, it is advisable to provide for driving the drum at a slower surface speed and to provide for regulating such speed. For this purpose a Reeves or other variable speed changer 41 may be provided between the belt driving pulleys and the source of power. For instance the pulleys 37, 38, 39 and 40 may be driven by chains and sprockets from the Reeves drive 41 and the Reeves drive may be driven from the calender by a chain 42, or from an independent motor.

After the sheet material has been heated to substantially the vulcanizing temperature, it is immediately wound upon a curing drum in successive convolutions. The curing drum has been heated to vulcanizing temperature so that no loss of heat takes place in the sheet material. For this purpose, a heating and winding drum 41 is provided. This drum is supported from one side by a hollow trunnion 42 which is rotatably mounted in a pedestal 43. The drum is hollow and is formed with a shoulder 44 on its outer face to align the curing drum which is slidably mounted upon the drum 41. The curing drum is preferably formed of a pair of rings 45, 46 to which a shell 47 of sheet metal is attached.

Steam, hot water, or other heating fluid is supplied to the drum by pipes 48, 49 connected to a mill-T 50 swiveled in the trunnion 42, or the drum may be heated electrically or by other means if desired. The drum 41 may be driven through a sprocket 51, attached thereto, from any convenient source of power, such as a motor 52 preferably of the variable speed type, so that it may be rotated independently of the other mechanism. The pedestal 43 which supports the drum 41, also supports a roll 53 of fabric liner material in close proximity thereto and a pressing roll 54 journaled on a swing arm 55 pivotally mounted on the pedestal 41, bears against the face of the drum to roll the material in place.

In practicing the method of the invention, the curing form is placed upon the heated drum 41. Several layers of liner material are drawn from the roll 53 and wound upon the shell to provide a smooth pervious surface. The rubber sheet material which has been heated substantially to vulcanizing temperature by passing it around the heated drum 27, is now wound upon the curing form in successive convolutions, the starched surface preventing adhesion of the convolutions. After a sufficient length of rubber material has been wound upon the form, a plurality of layers of fabric liner are wound thereon from the supply 53. A helical wrapping of tape is applied thereover to hold the material in place. The curing form, and the material thereon are all at substantially the vulcanizing temperture and may be transferred to a vulcanizer where vulcanization may be started at once at the vulcanizing temperature without gradually bringing up the temperature, thereby making for greater uniformity of vulcanization throughout the rubber and considerably shortening the time of cure and simplifying the operation of vulcanization so as not to require such constant attention of the operator as would be required for frequent adjustments of temperature.

Due to the fact that the curing form and the rubber material are at the vulcanizing temperature at the start of the vulcanizing step, a relatively thicker mass of rubber, and therefore a longer continuous length thereof may be applied to the form and cured during a single operation with a high degree of uniformity of vulcanization, as the process of vulcanization, where such small percentages of vulcanizing agents are present as, for example, are used in the production of rubber thread material, is neither strongly endothermic or exothermic and once the mass is at the vulcanizing temperature, vulcanization proceeds uniformly therethrough as long as such temperature is maintained. The heat actually expended in the vulcanizing step is merely that necessary to prevent cooling of the mass.

If desired the steps of calendering and inspecting may be separately performed, the process being confined to progressively heating the sheet to substantially vulcanizing temperature, winding it upon a curing form while maintaining its temperature and vulcanizing the material as a mass while at its final vulcanizing temperature. However, the amount of heat necessary to raise the sheet to vulcanizing temperature is lessened by taking the material direct from the calender so that the heat in the rubber resulting from the calendering operation will be conserved.

The apparatus illustrated and described herein is illustrative. Various changes may be made without departing from the scope of the invention as it is defined by the following claims.

What is claimed is:

1. The method of making vulcanized rubber material of a uniformly elastic nature which comprises progressively heating a single ply of unvulcanized rubber composition to substantially the vulcanizing temperature thereof, assembling the sheet material on itself to form a thick body comprising a multiplicity of plies thereof at substantially the vulcanizing temperature before its temperature has substantially decreased in any part thereof by loss of heat, and applying further heat and pressure to the body to vulcanize the sheet material substantially uniformly throughout its extent without substantially raising the temperature of the body beyond the temperature of the plies when assembled.

2. The method of making vulcanized rubber material of a uniformly elastic nature which comprises progressively heating a single ply of unvulcanized rubber composition to substantially the vulcanizing temperature thereof, winding the sheet material on itself to form a thick body comprising a multiplicity of plies thereof at substantially the vulcanizing temperature before its temperature has substantially decreased in any part thereof by loss of heat, and applying further heat and pressure to the body to vulcanize the sheet material substantially uniformly throughout its extent without substantially raising the temperature of the body beyond the temperature of the plies when assembled.

3. The method of making vulcanized rubber material of a uniformly elastic nature which comprises progressively forming a single ply of unvulcanized sheet material from a mass thereof by the use of pressure and heat sufficient to raise the temperature of the sheet to substantially the vulcanizing temperature thereof, assembling the sheet material on itself to form a thick body comprising a multiplicity of plies thereof at substantially the vulcanizing temperature before its temperature has substantially decreased in any part thereof by loss of heat, and applying further heat and pressure to the body to vulcanize the sheet material substantially uniformly throughout its extent without substantially raising the temperature of the body beyond the temperature of the plies when assembled.

4. The method of making vulcanized rubber material of a uniformly elastic nature which comprises progressively forming a single ply of unvulcanized sheet material from a mass thereof by the use of pressure and heat sufficient to raise the temperature of the sheet to substantially the vulcanizing temperature thereof, winding the sheet material on itself to form a thick body comprising a multiplicity of plies thereof at substantially the vulcanizing temperature before its temperature has substantially decreased in any part thereof by loss of heat, and applying further heat and pressure to the body to vulcanize the sheet material substantially uniformly throughout its extent without substantially raising the temperature of the body beyond the temperature of the plies when assembled.

KATHRYN J. DIETERICH,
*Executrix of the Estate of Ernest O. Dieterich, Deceased.*